UNITED STATES PATENT OFFICE.

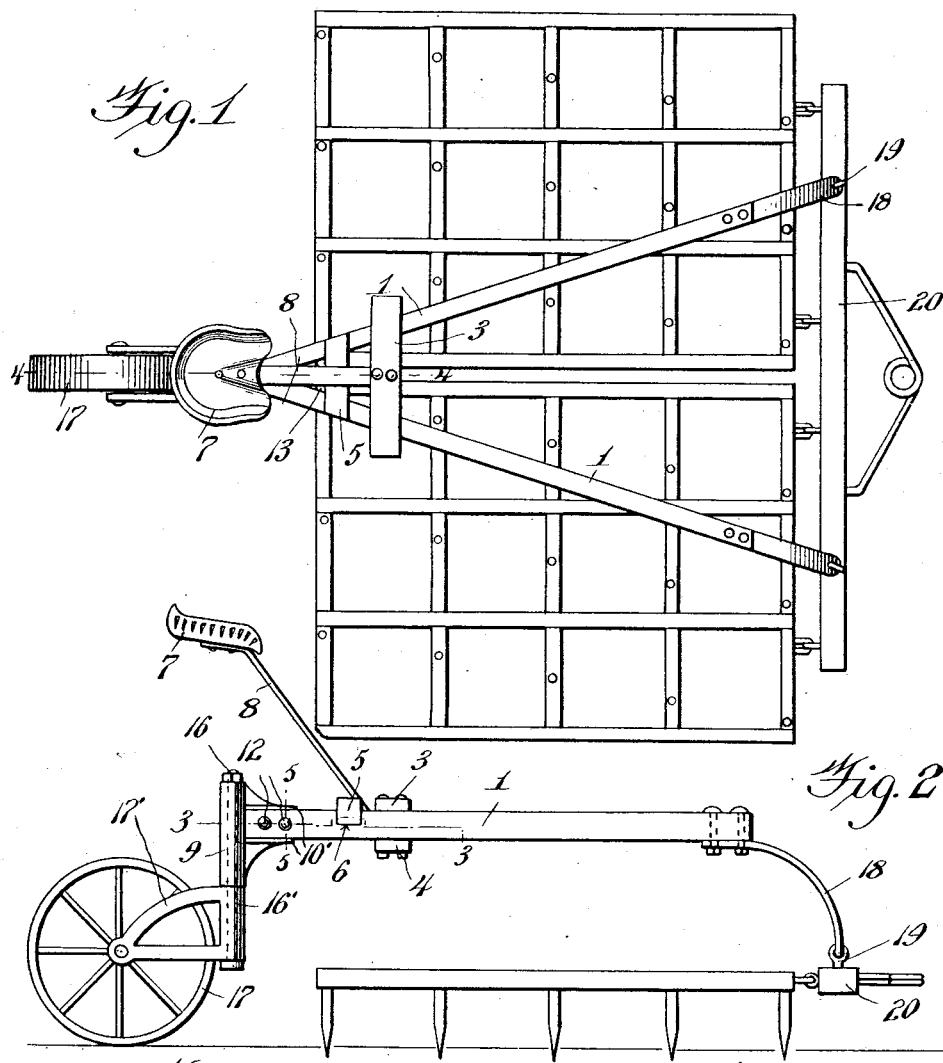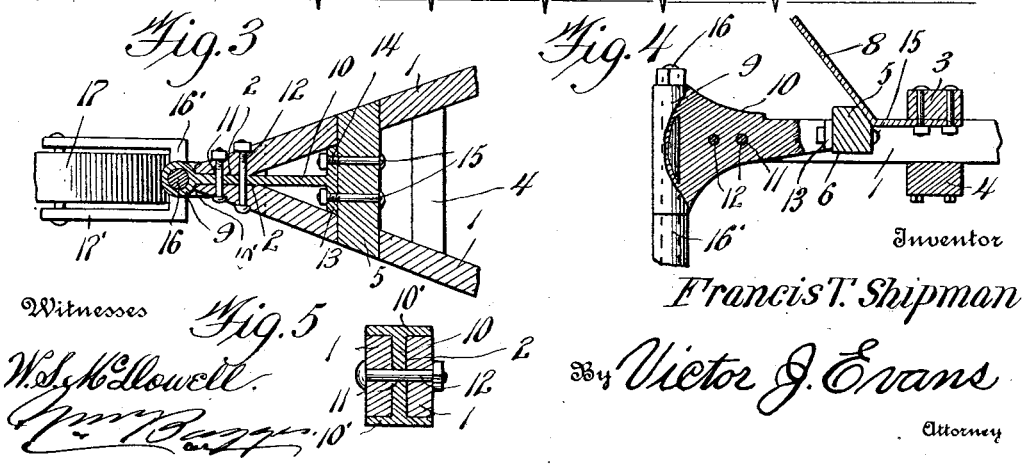

FRANCIS T. SHIPMAN, OF BIRCH HILLS, SASKATCHEWAN, CANADA.

HARROW-CART.

1,053,884. Specification of Letters Patent. Patented Feb. 18, 1913.

Application filed May 8, 1912. Serial No. 695,963.

*To all whom it may concern:*

Be it known that I, FRANCIS T. SHIPMAN, a subject of the King of Great Britain, residing at Birch Hills, in the Province of Saskatchewan and Dominion of Canada, have invented new and useful Improvements in Harrow-Carts, of which the following is a specification.

This invention relates to riding attachments for harrows which are generally known as harrow carts, and it has for its object to produce a device of this class which shall be simple and inexpensive in construction and readily applied for use in connection with an ordinary harrow.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of the improved harrow cart. Fig. 2 is a side elevation. Fig. 3 is a sectional detail view taken on the line 3—3 in Fig. 2. Fig. 4 is a vertical sectional detail view taken on the line 4—4 in Fig. 1. Fig. 5 is a sectional detail view taken on the line 5—5 in Fig. 2.

Corresponding parts in the several figures are denoted by like characters of reference.

The improved harrow attachment is composed essentially of two side beams 1, 1 which are connected together in V-shape, the meeting ends of said bars being beveled to present the opposed faces 2. The side bars are connected together by a top bar 3 which affords a foot rest for the driver or operator; by a bottom bar 4; and by a second top bar 5 which is secured in mortises or recesses 6 in the upper sides of the side bars 1. A seat 7 is mounted on a spring bar 8, the lower end of which is secured upon the underside of the top bar or cross bar 3, said spring bar being supported on the cross bar 5.

9 designates a bearing sleeve which is provided with a forwardly extending bracket 10 which is interposed between the beveled meeting faces 2, 2 of the side bars 1, 1, said bracket being provided with apertures 11 for the passage of the bolts or fastening members 12, whereby the side bars are secured together. The bracket 10 is provided at its front end with a T-head 13 having apertures 14 for the passage of bolts or fastening members 15, whereby said head is secured on the rear side of the cross bar 5. The sleeve 9 affords a bearing for a vertical shaft or bolt 16 on the lower end of which is mounted a sleeve 16' carrying a fork 17' in which is journaled a wheel 17 which supports the rear end of the structure. Said wheel 17 constitutes a trailer which, owing to the swivel connection of the sleeve 16' with the shaft or bolt 16, will readily adapt itself to the turning or guiding of the device, as may be required. The bracket 10 which extends from the sleeve 9 is provided on opposite sides thereof with laterally extending flanges 10' between which the rear ends of the side beams 1, 1 of the frame structure are fitted, thereby reinforcing the frame structure very materially and avoiding the splitting of the side beams 1, 1 by the bolts or connecting members 12 passing transversely therethrough.

The side bars 1, 1 are provided at their front ends with downwardly extending arms or brackets 18 having eye bolts 19, whereby said arms or brackets may be connected with the draft bar of an ordinary harrow which may be made up of one or more sections, as is well understood. The draft bar is indicated at 20.

From the foregoing description, taken in connection with the drawing hereto annexed, the operation and advantages of this invention will be readily understood.

The improved riding attachment, as will be seen, is extremely simple in construction and may be manufactured and marketed at a very moderate expense. It may be readily applied to and used in connection with any ordinary harrow which may thus be operated without necessity for walking. The operator is positioned sufficiently close to the draft animals to enable him to have perfect control, and the device affords a safe and comfortable seat.

Having thus described the invention, what is claimed as new, is:—

1. In a riding attachment for harrows, a frame structure comprising a pair of forwardly divergent side bars having beveled meeting faces, cross bars connecting said side bars, a bearing sleeve having a bracket interposed between the beveled meeting faces of the side bars and provided with a T-head bolted on one of the cross bars, fastening members extending through the rear ends of the side bars and through the bracket of the bearing sleeve, a shaft mounted in said sleeve, and a sleeve journaled on the lower end of the shaft and having a fork carrying a supporting wheel.

2. In a riding attachment for harrows, a frame structure comprising a pair of forwardly divergent side bars having beveled meeting faces, cross bars connecting said side bars, a bearing sleeve having a bracket interposed between the beveled meeting faces of the side bars, said bracket being provided with a T-head bolted on one of the cross bars and with laterally extending flanges overlapping the upper and lower faces of the side bars, fastening members extending through the rear ends of the side bars and through the bracket of the bearing sleeve intermediate the laterally extending flanges, a shaft mounted in the sleeve, and a sleeve journaled on the lower end of the shaft and having a fork carrying a supporting wheel.

In testimony whereof I affix my signature in presence of two witnesses.

FRANCIS T. SHIPMAN.

Witnesses:
ANDREW JAMIESON,
LAURA JANE JAMIESON.

Copies of this patent may be obtained for five cents each, by addressing the "Commissioner of Patents, Washington, D. C."